(12) United States Patent
Kopocs et al.

(10) Patent No.: US 7,104,294 B2
(45) Date of Patent: *Sep. 12, 2006

(54) STUMP GRINDING APPARATUS

(75) Inventors: Jared S. Kopocs, Wakeman, OH (US); Robert P. Zeihm, Grafton, OH (US); Carl Kopocs, Vermilion, OH (US)

(73) Assignee: Bucktooth Grinding Co., LLC, Vermilion, OH (US)

(*) Notice: Subject to any disclaimer, the term of this patent is extended or adjusted under 35 U.S.C. 154(b) by 281 days.

This patent is subject to a terminal disclaimer.

(21) Appl. No.: 10/799,583

(22) Filed: Mar. 11, 2004

(65) Prior Publication Data

US 2004/0182477 A1  Sep. 23, 2004

Related U.S. Application Data

(63) Continuation-in-part of application No. 10/139,930, filed on May 7, 2002, now Pat. No. 6,708,743.

(51) Int. Cl.
*A01G 23/06* (2006.01)
*B27M 3/00* (2006.01)

(52) U.S. Cl. .................. 144/24.12; 144/235; 144/241; 144/334; 249/102

(58) Field of Classification Search ............... 144/235, 144/241, 24.12, 218, 223, 228, 334; 37/189, 37/302; 125/39; 241/294, 101.73; 451/540; 299/102, 103, 106–108
See application file for complete search history.

(56) References Cited

U.S. PATENT DOCUMENTS

| | | | | |
|---|---|---|---|---|
| 2,452,081 | A | * | 10/1948 | Sullinger .................... 299/102 |
| 2,976,028 | A | * | 3/1961 | Saxman ...................... 299/108 |
| 3,256,043 | A | * | 6/1966 | Krekeler ..................... 299/108 |
| 3,570,566 | A | | 3/1971 | McCreery |
| 3,797,544 | A | | 3/1974 | Ver Ploeg |
| 3,935,887 | A | | 2/1976 | Van Zante et al. |
| 4,094,611 | A | * | 6/1978 | Harper et al. ................. 403/14 |
| 4,275,929 | A | * | 6/1981 | Krekeler ..................... 299/102 |
| 4,542,943 | A | * | 9/1985 | Montgomery, Jr. ......... 299/102 |
| 4,759,394 | A | | 7/1988 | Clemenson |
| 4,998,574 | A | * | 3/1991 | Beach et al. ................ 144/241 |
| 5,005,622 | A | * | 4/1991 | Beach et al. ................ 144/241 |
| 5,279,345 | A | * | 1/1994 | LeMaux et al. ............ 144/235 |
| 6,382,277 | B1 | | 5/2002 | Paumier et al. |
| 6,484,766 | B1 | * | 11/2002 | Falatok et al. ........... 144/24.12 |
| 6,546,977 | B1 | | 4/2003 | Monyak et al. |
| 6,601,620 | B1 | | 8/2003 | Monyak et al. |

* cited by examiner

*Primary Examiner*—Bena Miller
(74) *Attorney, Agent, or Firm*—Rankin, Hill, Porter & Clark LLP (57) ABSTRACT

The present invention provides a stump grinding apparatus. The apparatus includes a rotatable wheel, a plurality of blocks each having an inner side attached to a side of the rotatable wheel, and a plurality of teeth each individually received within a groove formed on an outer side of the block. Fasteners pass through a base portion of the teeth and thereby hold the teeth to the blocks and the blocks to the wheel.

20 Claims, 8 Drawing Sheets

STUMP GRINDING APPARATUS

CROSS-REFERENCE TO RELATED APPLICATION

This is a continuation-in-part of application Ser. No. 10/139,930, filed May 7, 2002, now U.S. Pat. No. 6,708,743.

BACKGROUND OF THE INVENTION

1. Field of Invention

The present invention relates to a tree stump grinding apparatus. More particularly, the invention relates to a stump grinding apparatus that includes a wheel and a plurality of blocks attached to the wheel that hold a cutting tooth.

2. Description of Related Art

Conventional stump grinding machines comprise a vertically oriented rotatable wheel having a plurality of cutting teeth mounted on the sides and/or the peripheral edge thereof. The rotating wheel is moved toward a tree stump, typically using an extension arm or boom. The cutting teeth mounted on the rotating wheel contact the tree stump and grind or cut away the stump until it is completely removed.

During normal operation of the stump grinder, the cutting teeth are subjected to large impact and abrading forces, which can cause the teeth to break off or wear out. When this occurs, one or more teeth, and sometimes the entire wheel, must be replaced. Replacement of stump grinding teeth can be a time consuming process, in part because the radial projection of each tooth must be adjusted to a predetermined, optimum value before fastening the tooth to the wheel. Replacement of the entire wheel is more time consuming and costly than simply replacing worn out or broken teeth.

In some prior art stump grinding devices, cutting teeth are directly fastened to the rotary wheel using fasteners or by welds. If the tooth is fastened to the wheel using a bolt, for example, then the bolt is solely responsible for holding the tooth to the wheel. If the impact force applied to the tooth is larger than the bolt's shear strength the bolt will fail and the tooth will shear away from the wheel. In such arrangements, the wheel can also be damaged when a large impact force is applied to one or more teeth. The impact force on the tooth is communicated directly to inner surfaces of the wheel that define the hole that receives the bolt. The impact force may cause the hole through which the bolt passes to misshape or enlarge. Consequently, the fit of a replacement bolt may become loose and subject the tooth and wheel to additional damage.

Mounting the tooth to a block on the periphery of the wheel does not provide a suitably thick section on which to fasten the tooth. Because there is no thick wheel portion to support the block, and further to support the tooth, there is an increased likelihood that the tooth and block may be sheared from the wheel.

With reference to teeth that fasten directly to the wheel, a proper seat of the tooth against the wheel is desirable. Teeth that are formed from cast metal sometimes have protuberances and bumps that, although small, preclude a flat surface-to-surface contact between the tooth and the wheel. This can allow play between the tooth and the wheel and can exacerbate the effect that the impact force has on the tooth. Also, moisture can wick under the tooth to create rust and corrosion.

BRIEF SUMMARY OF THE INVENTION

The present invention provides a stump grinding apparatus that comprises a rotatable wheel and a plurality of blocks having an inner side that contact a side of the wheel between an axial center of the wheel and a peripheral edge of the wheel. A groove is formed in an outer side of the block, and a first aperture is formed in the groove. One end of a cutting tooth, which has a second aperture formed therein, is received in the groove such that the second aperture is aligned with the first aperture. A fastener extends through the first aperture and the second aperture to fasten the block and tooth to the wheel. A cutting bit is attached to an opposite end of the cutting tooth. When the wheel is rotated, the cutting bit is brought into contact with a tree stump. The cutting bit cuts portions of the stump away until the entire stump is removed.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
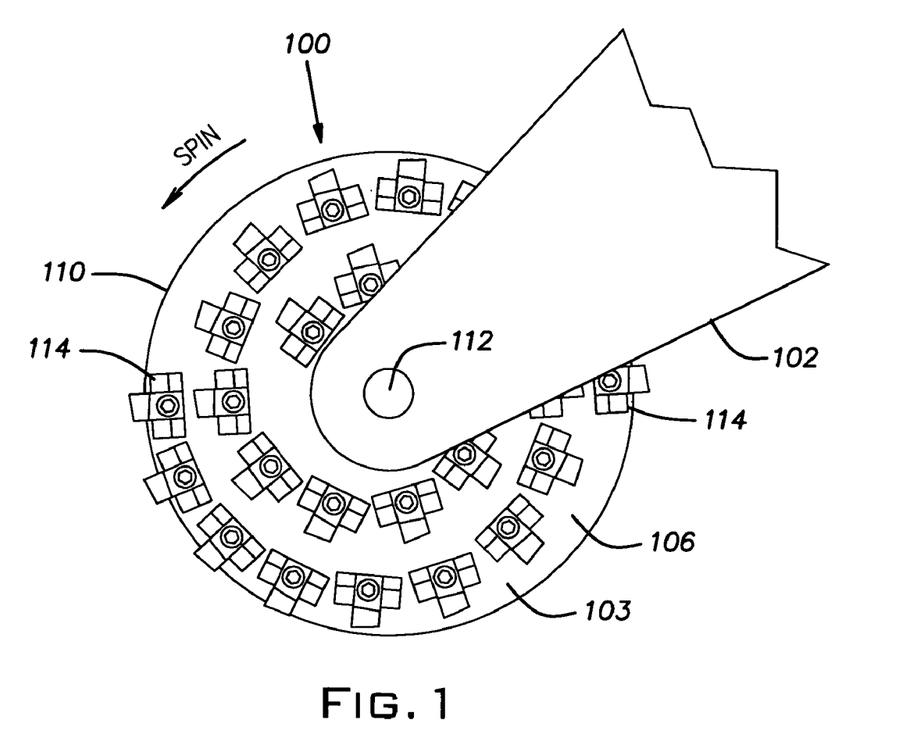
FIG. 1 is a schematic side view of one embodiment of an apparatus according to the invention.

FIG. 1 is a schematic side view of an embodiment of a stump-grinding apparatus 100 in accordance with the invention. The apparatus 100 comprises a wheel 106 having a peripheral edge 110 and a central axis 112. Cutting assemblies 114 are mounted to at least one and preferably both sides 103 of the wheel 106, preferably in one or more spiral arrays that radiate from near the central axis 112 toward the peripheral edge 110. The apparatus 100 is mounted to an arm or boom 102 of a stump-grinding machine that drives and rotates the apparatus 100 in the direction shown by the arrow labeled SPIN. The apparatus 100, when rotated, can be used to grind and cut away a tree stump as part of land clearing operations.

The wheel 106 is preferably a solid disk formed of a heavy, durable material such as steel. The wheel 106 can be of any desired size. Wheels having a diameter of about 122 centimeter (cm) (48 inch) and a thickness of about 3.8 cm (1.5 inch) are preferred because they can be mounted and driven by existing stump-grinding machines such as, for example, a Hurricane stump grinder, commercially available from JP Carlton Company, Inc. (Spartanburg, S.C.). It will be appreciated that the dimensions of the wheel 106 can be sized to accommodate other commercially available stump grinder machines. Larger wheels have more mass, and thus more cutting force when rotated.

Figure 2:
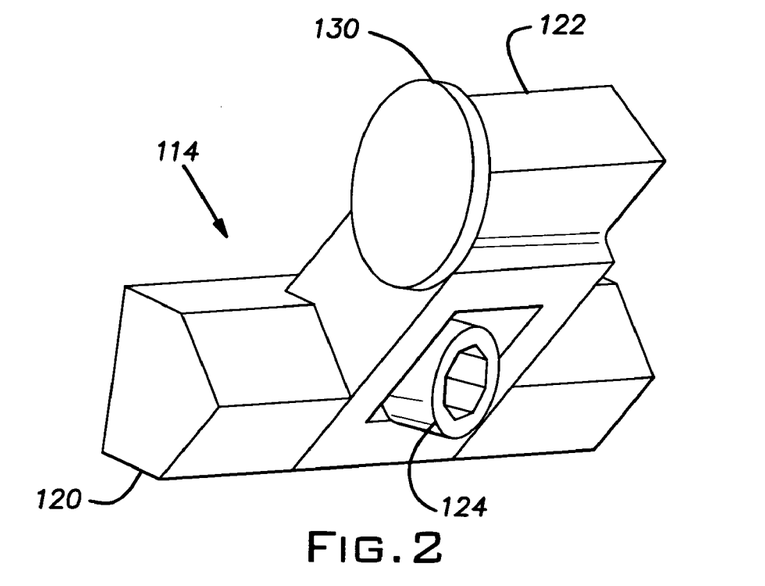
FIG. 2 is a perspective view of a portion of the apparatus shown in FIG. 1.

FIG. 2 is a perspective view of one embodiment of a cutting assembly 114 that can be mounted to the wheel 106. The cutting assembly 114 includes a block 120 and a tooth 122 that is received in a groove formed in an outer side of the block 120. A bolt 124 passes through apertures formed in the tooth 122 and the block 120. A cutting bit 130 is attached to an opposite end of the tooth 122 from the bolt 124. The bolt 124 also attaches the block 120 to the wheel 106. Thus, the tooth 122 is attached to and supported by the block 120, which is attached to and supported by the wheel 106.

Figure 3:
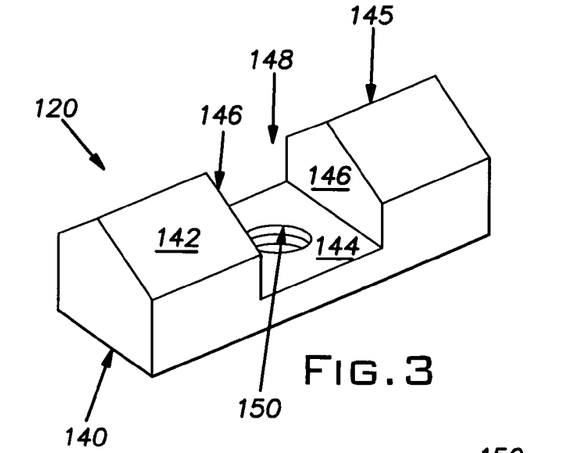
FIG. 3 is a perspective view of a portion of the portion of the apparatus shown in FIG. 2.
Figure 4:
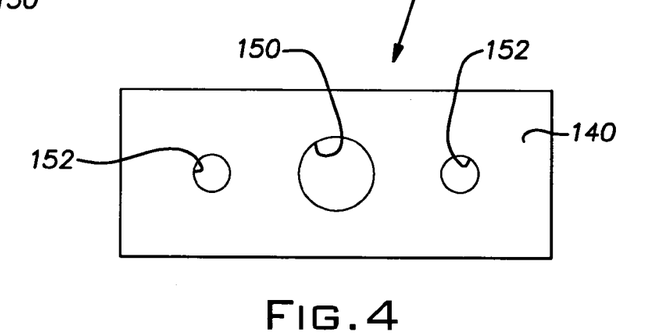
FIG. 4 is a bottom view of the portion of the apparatus shown in FIG. 3.

FIGS. 3 and 4 are perspective and bottom views of the block 120 shown in FIG. 2. In this embodiment, the block 120 has an inner side 140 and an outer side 142, which is opposite the inner side 140. A groove 148 is formed in the outer side 142 of the block. The groove 148 is defined by a bottom surface 144 and two side surfaces 146. An aperture 150, which may but need not be threaded, passes through the block 120 from the bottom surface 144 to the inner side 140. Preferably, the outer side 142 of the block 120 is faceted, and comprises two faces that meet to form a longitudinal ridge 145 that extends along the outer side 142.

Each block 120 is formed of a heavy durable material. In the presently most preferred embodiment of the invention, the blocks 120 are machined from calcium treated 4140 steel. The blocks can be of any desired dimension. Blocks that are about 15.2 cm (6 inches) long, about 5 cm (2 inches) tall, and about 5 cm (2 inches) wide are useful for mounting on large 48 inch wheels. A block 120 of this size weights about 1.6 Kilograms (Kg) (3.5 pounds).

Alignment cavities 152, which do not need to pass completely through the block 120, can be formed in the inner side 140 of the block 120, as shown in FIG. 4. In the illustrated embodiment, the alignment cavities 152 are spaced apart from each other and centered adjacent to the aperture 150. The alignment cavities 152 are sized and shaped to receive locating pins (not shown) that project from the side 103 of the wheel 106. The locating pins and alignment cavities 152 aid in locating and orienting the block 120 in the proper relationship on the side of the wheel 106.

The locating pins comprise high strength steel dowel pins that are received into corresponding cavities formed in the wheel 106. The locating pins need not be welded to the wheel 106 or to the block 120. Thus, the locating pins can be first pressed into the alignment cavities 152 in the block and then inserted into the corresponding cavities formed in the wheel 106 as the block 120 is pressed against the wheel 106 or, alternatively, the locating pins can be pressed into the cavities formed in the wheel 106 and can then be inserted into the alignment cavities 152 as the block is pressed against the wheel 106.

The inner side 140 of the block 120 can be welded to the side of the wheel 106 between the center hub 112 and the peripheral edge 110, but this is usually not necessary or desirable. As is explained in greater detail below, the block 120 is more preferably attached with its inner side adjacent to the side of the wheel 106 using one or more fasteners such as bolts. Welded blocks are difficult to remove from the wheel when they need to be replaced. In addition to insuring the proper location of the block 120 relative to the wheel 106, the locating pins provide additional lateral support to the block and take shear loads off the fasteners holding the block 120 to the wheel 106.

Figure 5:
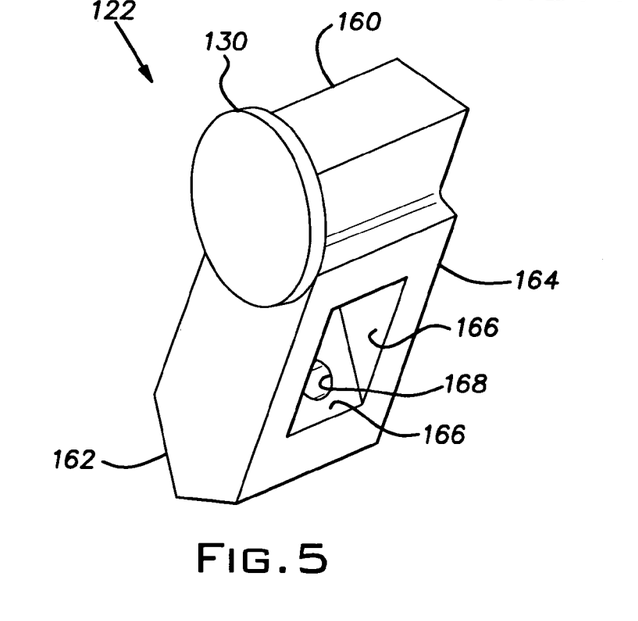
FIG. 5 is a perspective view of a different portion of the apparatus shown in FIG. 2.

FIG. 5 shows a perspective view of the tooth 122 shown in FIG. 2. The tooth 122 includes a base portion 162 and a distal portion 160. A body portion 164 extends from the base portion 162 to the distal portion 160. A cutting bit 130 is silver soldered or brazed to the distal portion 160 of the tooth 122. The cutting bit 130 can be round, such as shown in FIG. 5, or, more preferably, the cutting bit can have a shape that is similar to a church window (see FIG. 11).

The body portion 164 of the tooth 122 preferably includes a plurality of surfaces 166 that define a recessed area. One of the surfaces 166 further defines an aperture 168 (which may but need not be a smooth bore aperture) that extends from the recessed area through the base portion 162 of the tooth 122. The base portion 162 fits securely in the groove 148 formed in the block 120. The aperture 168 aligns with the aperture 150 in the block 120. When the apertures 150, 168 are aligned, the tooth 122 extends from the block 120, preferably at an angle of about 45 degrees from a plane defined by the side of the wheel 106. It will be appreciated that the angle of the teeth with respect to the plane defined by the side of the wheel can be adjusted to optimally suit the particular cutting conditions. Typically, the angle of the tooth with respect to the plane defined by the side of the wheel will be within the range of from about 0 to about 55 degrees. A fastener such as a bolt 124 passes through the aperture 168, the aperture 150 and into an opening formed in the wheel 106 to attach the block 120 and the tooth 122 to the wheel 106.

Each tooth 122 must be formed of a heavy, durable material. In the presently most preferred embodiment of the invention, each tooth is machined from 4140 ASM steel. The tooth 122 can be of any desired dimension. A tooth 122 that is suitable to be received in a block 120 for mounting to a 48" wheel will typically be about 8.5 cm (3.8 inches) long, about 5 cm (2 inches) wide, about 3.8 cm (1.5 inches) deep, and will weigh about 1.1 Kilograms (Kg) (2.5 pounds). It will be appreciated that the size and weight of a tooth 122 is not critical, and that teeth 122 having a varied dimensions may be used, depending upon the particular application.

During assembly, the tooth 122 is placed into the groove 148 in the block 120. A bolt 124 is used to fasten the tooth 122 to the block 120 and to fasten the block 120 to the side 103 of the wheel 106. If locating pins are formed on the side 103 of the wheel 106, the locating pins enter the corresponding alignment cavities 152 formed on the inner side 140 of the block 120 to insure that the block 120 is properly oriented and aligned on the side 103 of the wheel 106. Once aligned, the block 120 can be welded to the wheel 106 or, more preferably, can be fastened to the wheel using an appropriate fastener such as a bolt.

During operation, the wheel 106 rotates in the direction indicated by the directional arrow labeled SPIN in FIG. 1. Once the wheel 106 is rotating at the desired speed, the boom arm 102 moves the rotating apparatus 100 toward a tree stump that is to be removed. The cutting bits 130 attached to the distal end 160 of the teeth 122 contact the stump and rapidly cut and/or grind away the stump. A round shaped bit 130, as shown in FIG. 5, facilitates the cutting of soft wood and any adjacent sandy soil. A cutting bit having the shape of a church window (see FIG. 11) facilitates the cutting of hardwoods, and is also suitable for use in rocky soils.

Although the cutting assemblies 114 are preferably aligned on the side 103 of the wheel 106 in one or more successive spiral arrays that radiate from near the central axis 112 of the wheel 106 toward the peripheral edge 110 of the wheel 106 such that only the cutting bits 130 make contact with the stump, occasionally a portion of one or more teeth 122 or blocks 120 will impact against a portion of the stump and/or the ground during use. Without the support provided by the holding block 120, the shear strength of the tooth 122 would be dependent solely on the shear strength of the bolt 124. In that circumstance, if the shear load exceeded the shear strength of the bolt 124, then the tooth 122 would simply shear from the wheel 106. However, because the tooth 122 is received in groove 148 formed on the outer side 142 of the block 120, the tooth 122 receives support from both the fastener 124 and the holding block 120, which greatly increases the shear load that the tooth 122 can withstand before it fails.

One of the advantages realized by the present invention is that in the event that the shear load exerted against the tooth 122 is sufficient to shear the tooth 122 from the apparatus 100, the tooth 122 shears preferentially from the block 120, rather than from the wheel 106. This protects the wheel 106 from damage. Furthermore, the block 120 will accept a greater shear load before failure than the tooth 122. Thus, the block 120 will not shear from the wheel 106 before the tooth 122 shears from the block 120, which further protects the wheel 106.

If a tooth 122 is sheared from the block 120, a replacement tooth can be efficiently installed to replace the original, sheared-off tooth. The replacement tooth automatically aligns in the groove 148, so that the replacement tooth can be efficiently installed. Further, only the single bolt 124 is necessary to fasten a replacement tooth, rather than, for example, two bolts. No welding of any kind is needed. Furthermore, the mass of the block 120 is so substantial that it does not become damaged when a tooth 122 is sheared from the block 120.

In the unlikely event that the entire cutting assembly 114 is sheared from the wheel 106, a replacement cutting assembly 114 can be efficiently installed to replace the original, sheared-off cutting assembly 114. The replacement cutting assembly 114 can be quickly and properly installed on the side 103 of the wheel 106 in the field when the wheel 106 locating pins that align with locating cavities 152 formed in the inner side 140 of the block 120.

Figure 6:
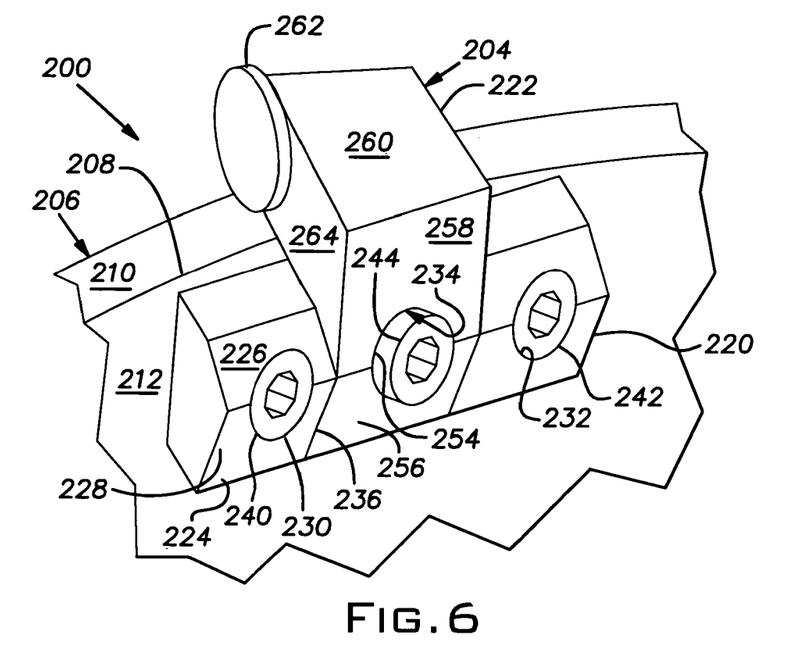
FIG. 6 is a perspective view of a portion of another embodiment of an apparatus according to the invention.

A portion of an alternative embodiment of an apparatus 200 of the present invention is shown in FIG. 6. The apparatus 200 includes a wheel 206 having a peripheral edge 208 that separates a peripheral edge surface 210 from a side surface 212, which is preferably flat. A cutting assembly 204 mounts on the side surface 212 of the wheel 206 proximate to the edge 208. The cutting assembly 204 includes a holding block 220 and a cutting tooth 222 that is received within a groove 236 formed in an outer side 224 of the holding block 220.

In the embodiment of the invention shown in FIG. 6, the outer surface 224 of the block 220 includes first and second facets 226, 228, that intersect to form a longitudinal ridge that extends along the length of the block 220. The first plane 226 and the second plane 228 form angles of about 35 degrees and 55 degrees, respectively, relative to a plane defined by the side surface 212 of the wheel 206. It will be appreciated that the angles formed between the first plane 226 the second plane 228 relative to the plane defined by the side surface 212 of the wheel 206 are not critical, and that any combination of angles could be used.

First and second apertures 230, 232, are formed in the block 220. The apertures 230, 232, which may be smooth bore apertures, are preferably spaced equally distant from a third or middle aperture, which is centered in the groove 236 formed in the outer side 224 of the block 220. The apertures 230, 232 preferably have a larger diameter than the third, middle aperture. The apertures 230, 232 align with corresponding apertures (not shown) in the wheel 206.

Bolts 240, 242 and 244, respectively, extend through the apertures 230, 232 and the third, middle aperture through the block 220, and further extend into the corresponding apertures formed in the wheel 206. Allen head bolts are shown in FIG. 6, but it will be appreciated that other types of bolts can be used. The bolts 240, 242 and 244 can be fastened to nuts (not shown) on the opposite side of the wheel 206 from the block 220 or, more preferably, can be threaded into apertures formed in another block 220 on the opposite side of the wheel 206.

An aperture 254 formed in the tooth 222 aligns with both the third, middle aperture in the block 220 and a corresponding aperture formed in the wheel 206. The bolt 244 fastens the cutting tooth 222 to the block 220 and the block 220 to the wheel 206. As described above, the bolt 244 extends through both the aperture 254 and the aperture in the block 220, and further through the corresponding aperture through the wheel 206.

The tooth 222 can be described in terms of three portions. Specifically, the tooth 222 extends from a base portion 256 along a middle portion 258 to a distal portion 260. A cutting bit 262 is connected to a lead side 264 of the tooth 22 at the distal portion 260. The cutting bit 262 can be attached by soldering, brazing or other effective conventional attachment means. In the embodiment of the invention shown in FIG. 6, the middle portion 258 of the tooth 222 extends from the base portion 256 beyond and around the peripheral edge 208 of the wheel 206. The distal portion 260 is spaced radially from the edge surface 210 with reference to the wheel 206. Thus, the cutting bit 262 overhangs and thereby protects the edge surface 210 from wear.

During operation, the rotating wheel 206 is moved toward a tree stump to be removed. The cutting bits 262 make contact with the tree stump and successively cut parts of it away until it is removed. Because the cutting bits 262 extend from the wheel 206, the cutting bits 262 preferentially contact the stump, but the peripheral edge 210 of the wheel 206 does not. As the cutting bits 262 impact against the stump, the tooth 222 is subjected to a shearing force. If the shearing force exceeds the shear strength of the tooth 222, the tooth 222 will preferentially shear from the block 220. The block 220 supports the tooth 222 and thus increases the shear load necessary to shear the tooth 222 from the block 220.

If a tooth 222 is sheared from a block 220, a replacement tooth can be quickly installed. In order to ensure that the tooth 222 shears from the block 220 in preference to the block 220 shearing from the wheel 206, the bolt 244 used to attach the tooth 222 to the block 220 preferably has a smaller diameter and thus a lower shear strength than the bolts 240, 242 that attach the block 220 to the wheel 206. Furthermore, in the very unlikely event that the entire cutting assembly 204 shears from the wheel 206, a replacement cutting assembly 204 can be installed to replace the original, sheared-off assembly. The apertures 230, 232 align with the corresponding apertures in the wheel 206, which facilitates efficient location, orientation and installation of a replacement assembly 204 on the wheel 206. No locating pins or alignment cavities are needed.

Figure 7:
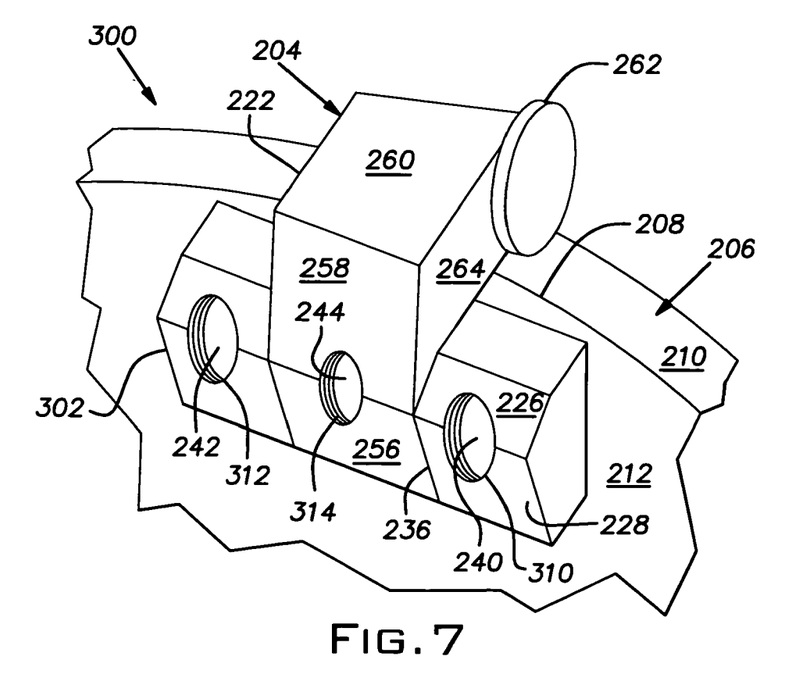
FIG. 7 is a perspective view of a portion of another embodiment of an apparatus according to the invention.

FIG. 7 shows a holding block 302 that includes threaded apertures 310, 312 and 314. Many of the components of the apparatus 300 shown in FIG. 7 are substantially similar to components shown in FIG. 6, and thus the same reference numerals are used. The apparatus 300 shown in FIG. 7 can be used to receive the threaded ends of bolts 240, 242 and 244, which extend through an apparatus 200 as shown in FIG. 6, through apertures in the wheel 206, and into threaded apertures 310, 312 and 314, respectively. Preferably, the ends of the bolts 240, 242 and 244 do not extend through the apertures above the outer surface of the block, where they could be damaged due to impact. In a preferred embodiment, apparatus 200 is attached on a first side of a wheel 206 and apparatus 300 is attached to an opposite second side of the wheel 206, with both being attached to the wheel 206 using bolts 240, 242 and 244.

Figure 8:
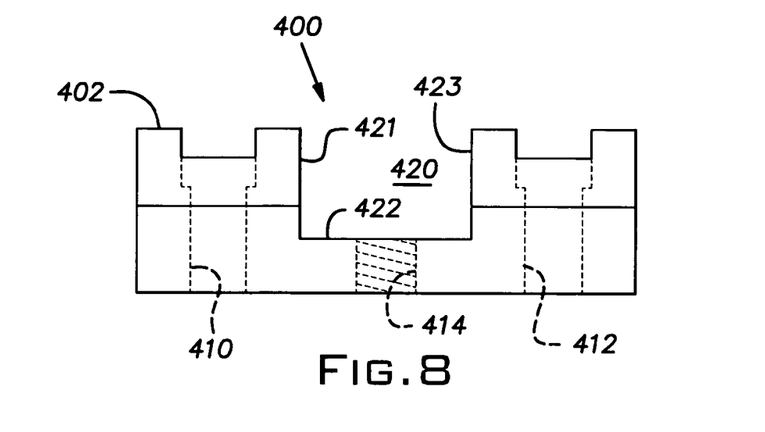
FIG. 8 is a schematic side view of a portion of another embodiment of an apparatus according to the invention.

FIG. 8 shows a side view of an alternative arrangement of a holding block 402 for a tooth. Apertures 410, 412 and 414, respectively, pass through the block 402. Apertures 410 and 412 are equally spaced from the middle aperture 414, which is centered in the block 402 and further centered in a groove 420, which is defined by inner surfaces 421, 422 and 423. The apertures 410 and 412 are counter-sunk, smooth bore apertures that extend through the block 402. The block 402 can be attached to a wheel by passing a pair of bolts extend through the apertures 410, 412 and further through corresponding apertures in a wheel to corresponding nuts. Alternatively, the pair of bolts can be threadedly received in an opposing block on the opposite side of the wheel, such as shown in FIG. 7. The threaded portion of a bolt is received in aperture 414, which holds a tooth to the block 402.

Figure 9:
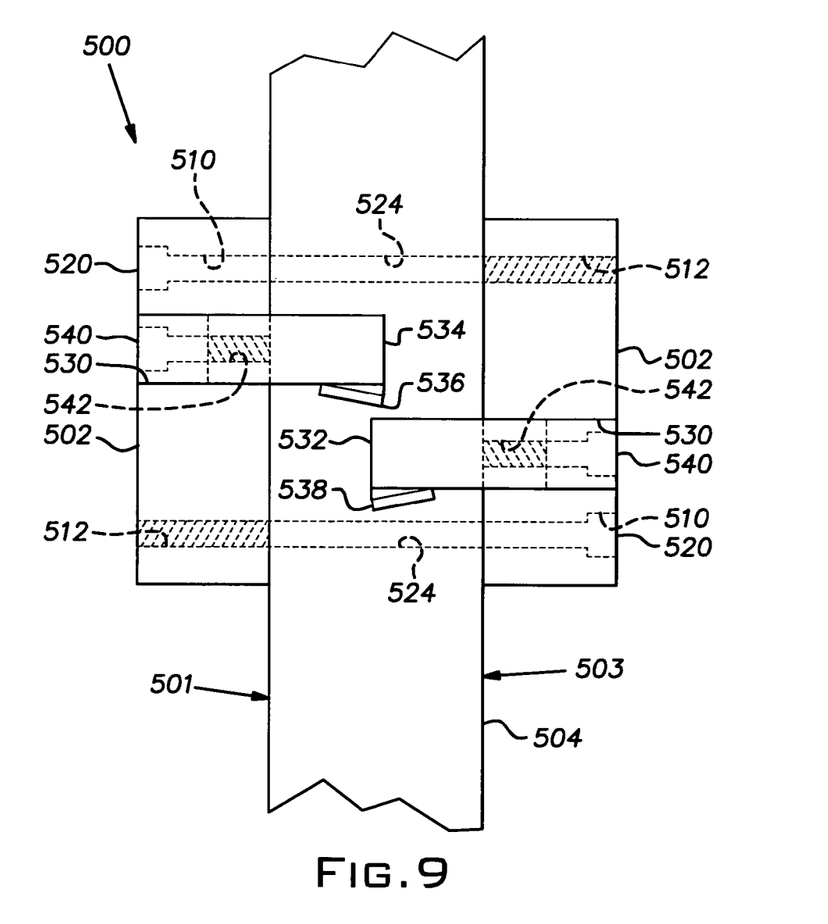
FIG. 9 is a schematic top view of a portion of another embodiment of an apparatus according to the invention.

Yet another embodiment of an apparatus 500 according to the invention is shown in FIG. 9. In this embodiment, the apparatus 500 includes a pair of holding blocks 502 that are mounted to opposite sides 501, 503 of a wheel 504. A counter-sunk, smooth bore aperture 510 and a first threaded aperture 512 are formed in each block 502. A bolt 520 extends through the smooth bore aperture 510, through a corresponding aperture 524 in the wheel 504, and is received in threaded aperture 512 on the opposite side of the wheel 504. The blocks 502 are oriented relative to each other so that the smooth bore aperture 510 of one block 502 aligns with the threaded aperture of the opposite block 502. A groove 530 is formed in an outer side of each block 502. Each groove 530 receives and holds a tooth that has a cutting bit 536 attached at a distal end. The cutting teeth 532, 534 are mirror opposites of each other. Each tooth 532, 534 has a cutting bit 536, 538 that is received in the groove 530 and oriented opposite of each other.

During assembly, the block 502 and the corresponding opposite block 502 are fastened to each other through the wheel 504. The first tooth 532 is oriented in the groove 530 so as to extend beyond and around the wheel 504. The second tooth 534 is received into the groove 530 of the opposite block 502 and is oriented opposite of the first tooth 532 to also extend beyond and around the wheel 504. Because the groove 530 of each block 502 is offset from the center of the block 502, the first and second teeth 532, 534 are likewise offset from each other. The cutting bits 536, 538 are angled relative to each other, such as by about 5 degrees, relative to a direction of rotation.

As the wheel 504 rotates, the cutting bits 536, 538 contact a tree stump and cut and/or grind away the stump. The blocks 502 provide additional support to the teeth 532, 534. In particular, the extended middle portion of the block provides increased support, while the shoulders are spaced from the cutting bits 536, 538 to decrease the risk of impact against the blocks 502. However, if an impact should shear off one of the teeth 532, 534, a replacement tooth of the same orientation can be installed in its place.

Figure 10:
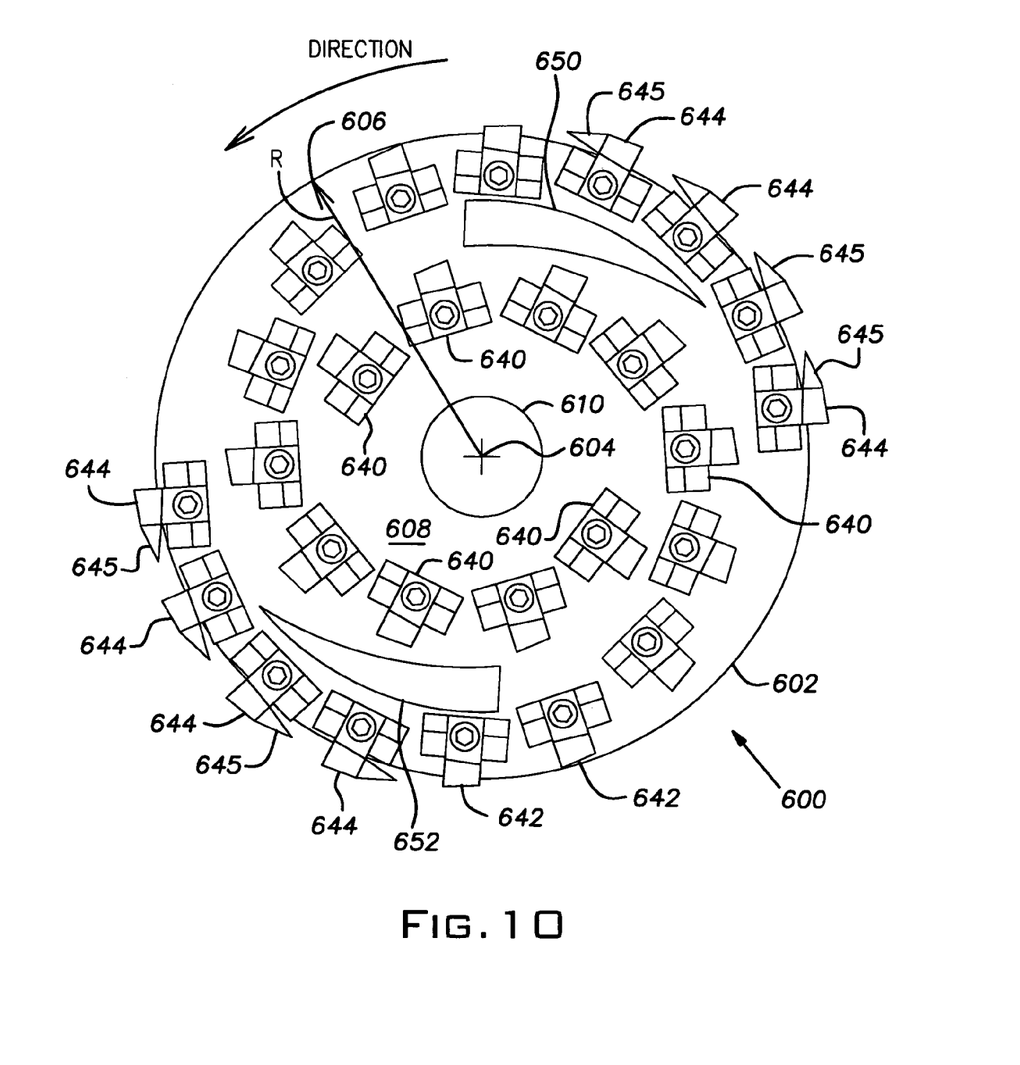
FIG. 10 is a schematic side view of another embodiment of an apparatus according to the invention.

FIG. 10 is a side schematic view of an apparatus according to the invention showing the preferred spiral arrangement of cutting assemblies 640, 642 and 644 on the side surface 608 of the wheel 602. The wheel 602 rotates about an axis 604. The line (R) shown on FIG. 10 represents the radius of the wheel 602, which extends from the axis 604 to a peripheral edge 606. An aperture 610 is provided through the wheel 602 at the axis 604, which facilitates mounting the wheel 602 to an arm or boom of a stump-grinding machine (not shown).

The plurality of cutting assemblies 640, 642 and 644 are mounted to the side 608 of the wheel 602 in spiral or helical arrays. The arrays include interior, medial and peripheral cutting assemblies 640, 642 and 644, respectively. The interior cutting assemblies 640 and medial cutting assemblies 642 can be configured as shown in FIG. 1 or any of the other embodiments. The peripheral cutting assembly 644 can be configured such as shown in FIGS. 6, 7 and 9. In FIG. 10, the peripheral cutting assemblies 644 include spike-shaped cutting bits 645, which can be used to facilitate plunge cutting and/or digging, for example, in rocky soil and in asphalt.

The interior cutting assemblies 640 and medial cutting assemblies 642 differ from each other by the angle of their teeth in relation to a plane defined by the wheel surface 608. The closer the interior and medial cutting assemblies 640, 642 are to the axis 604 of the wheel 602, the larger the relative angle between the respective tooth and the plane defined by the wheel surface 608. For example, the interior cutting assembly 640 can be fitted with teeth that form a 45 degree angle with respect to the surface of the wheel whereas the medial cutting assemblies can be fitted with teeth that form a 35 degree angle with respect to the surface of the wheel.

In the embodiment shown in FIG. 10, the interior cutting assemblies 640 and the medial cutting assemblies 642 are about three times as long as they are wide. Adjacent cutting assemblies are spaced from each other by a distance of about half the width of a cutting assembly. The primary intent of the arrangement of the cutting assemblies in arrays is to equally disperse the cutting bits on the surface of the wheel to evenly distribute the force applied against them and the wheel, which increases the speed of stump removal. In addition, as the wheel rotates, each successive cutting bit contacts and cuts away a successive portion of the stump. Because the arrays are preferably arranged in an overlapping spiral pattern there is at least one cutting assembly from each of the arrays cutting along the line (R). Therefore, two of the cutting assemblies are cutting along the line (R) rather than a single one if an array did not overlap with another array.

It is possible to further protect the side of the wheel by attaching a first and a second metal wear rail 650, 652 thereto. Each of the rails 650, 652 is oriented with relation to a respective one of the first and second spiral arrays. The wear rails 650, 652 are generally wedge shaped and are thickest near the peripheral edge 606 and taper to a thinnest point near the axis 604. The wear rails 650, 652 comprise, for example, USS "T-1" or USS Abrasion Resistant plate steel, commercially available from United States Steel Corporation (Pittsburgh, Pa.), and are welded to the wheel 602. Alternatively, other wear rails are bolted to the wheel 602 or both welded and bolted to the wheel 602.

To prevent corrosion, a protective coating, for example a wax coating, covers the entire apparatus 600. The coating can be periodically reapplied as necessary to maintain a desired level of corrosion protection. In an alternative embodiment, the holding blocks of peripheral cutting assemblies have tapering wedge-shapes on the exposed side of the block in the direction of a wheel rotation, which deflect force away from the block.

During operation, the wheel 602 rotates on the axis 604 preferably at about 800 revolutions per minute (RPM). The apparatus 600 is moved toward a tree stump until the cutting bits contact the stump and begin removing it. The cutting assemblies successively cut and grind the tree stump as the boom arm moves the wheel in a sweeping or plunging manner. Wood chips, rock and debris from the cutting and grinding impact against the wear rails 650, 652 preferentially rather than against the wheel 602. Consequently, the wear rails 650, 652 protect the wheel surface 608 and the cutting assemblies from at least a portion of the abrading force caused by the impact from the wood chips, rock and debris. Further, the wear rails 650, 652 add mass to the wheel 602 to increase its rotational moment of inertia.

Figure 11:
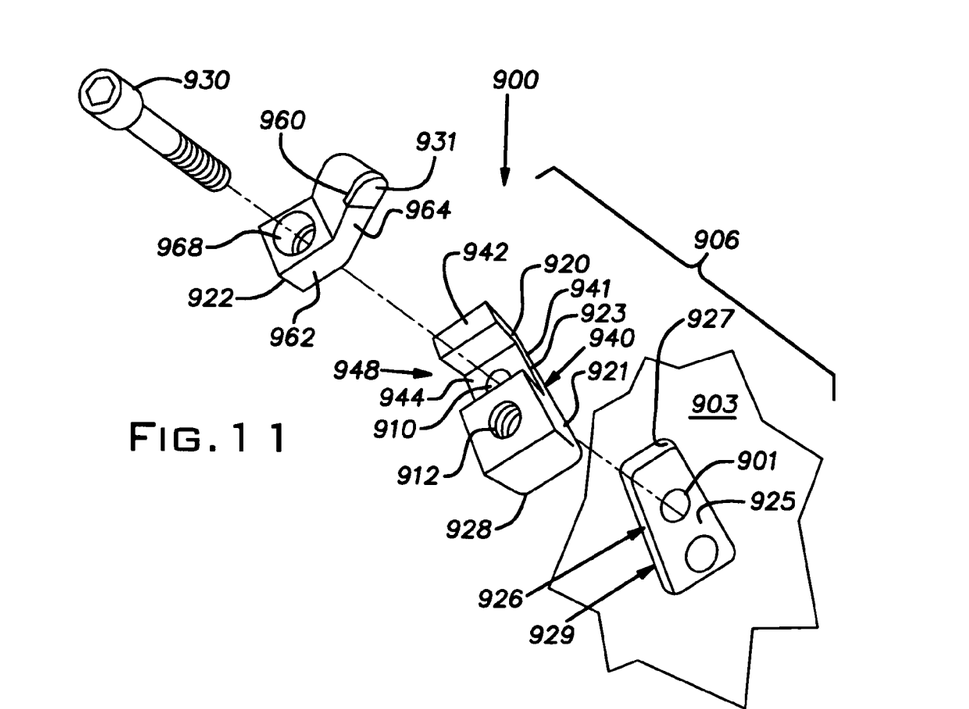
FIG. 11 is an exploded perspective view of a portion of the presently most preferred embodiment of an apparatus according to the invention.

The presently most preferred embodiment of an apparatus 900 according to the present invention is shown in FIGS. 11–15. FIG. 11 shows an exploded perspective view of a first cutting assembly 914 comprising a block 920 and a tooth 922 that are mounted to a side 903 of a wheel 906.

As shown in FIG. 11, a base portion 921 of the block 920, which is defined as the inner side 940 of the block 920 and a portion of the peripheral sidewall 923 of the block 920 proximal to the perimeter 941 of the inner side 940 of the block, is received within a footprint 924 formed in the side 903 of the wheel 906. The footprint 924 includes a floor portion 925 and a continuous sidewall portion 926. The base portion 921 of the block 920 is received in the footprint 924 such that the inner side 940 of the block contacts the floor portion 925 of the footprint 924 and the peripheral sidewall 923 proximal to the perimeter of the inner side 940 of the block 920 contacts the continuous sidewall 926 of the footprint 924. The footprint 924 facilitates alignment of the block 920 on the side 903 of the wheel 906. The footprint 924 also makes it significantly more difficult to shear the block 920 from the side 903 of the wheel 906.

Preferably, the corners 927 of the footprint 924 and the corners 928 of the base portion 921 of the block are radiused (i.e., they do not include any sharp angles). Radiused or rounded corners tend to spread and thus dissipate applied forces more efficiently than do sharp, angled corners. The use of rounded corners, therefore, further improves the strength of the apparatus 900.

A first aperture 910 passes through the block 920 from the inner side 940 to a base surface 944 of a groove 948 formed in the outer side 942 of the block 920. A second aperture 912 passes through the block 920 from the inner side 940 to the outer side 942 of the block 920. The first aperture 910 is preferably a smooth bore aperture. The second aperture 912 is preferably a threaded bore aperture.

A third aperture 968 passes through a base portion 962 of the tooth 922. A cutting bit 931, which preferably has a "church window" shape such as shown in FIG. 11, is brazed or soldered to a distal portion 960 of the tooth 922. Preferably, the back side of the cutting bit 931 is provided with a plurality of ridges that interlock and engage with ridges formed on the distal portion 960 of the tooth 922. The ridges improve the adhesion of the cutting bit 931 to the tooth 922.

A body portion 964 of the tooth 922 spans the distance between the base portion 962 and the distal portion 960. The body portion 964 preferably extends angularly away from the base portion 962 to position the distal end 960 and thus positions the cutting bit 931 above the outer side 942 of the block 920. As in prior embodiments of the invention, the teeth 922 installed in blocks 920 mounted closest to the central axis 904 of the wheel 906 preferably have a higher angular rise relative to a plane defined by the side 903 of the wheel 906 than do teeth 922 installed in blocks that are mounted farther away from the central axis 904 and nearer the peripheral edge 908 of the wheel.

A bolt 930 passes through the third aperture 968 formed in the base portion 960 of the tooth 922 and the first aperture 910 formed in the groove 948 in the outer side 942 of the block 920. Preferably the bolt 930 then passes through a fourth aperture 901 formed in the wheel 906.

Figure 12:
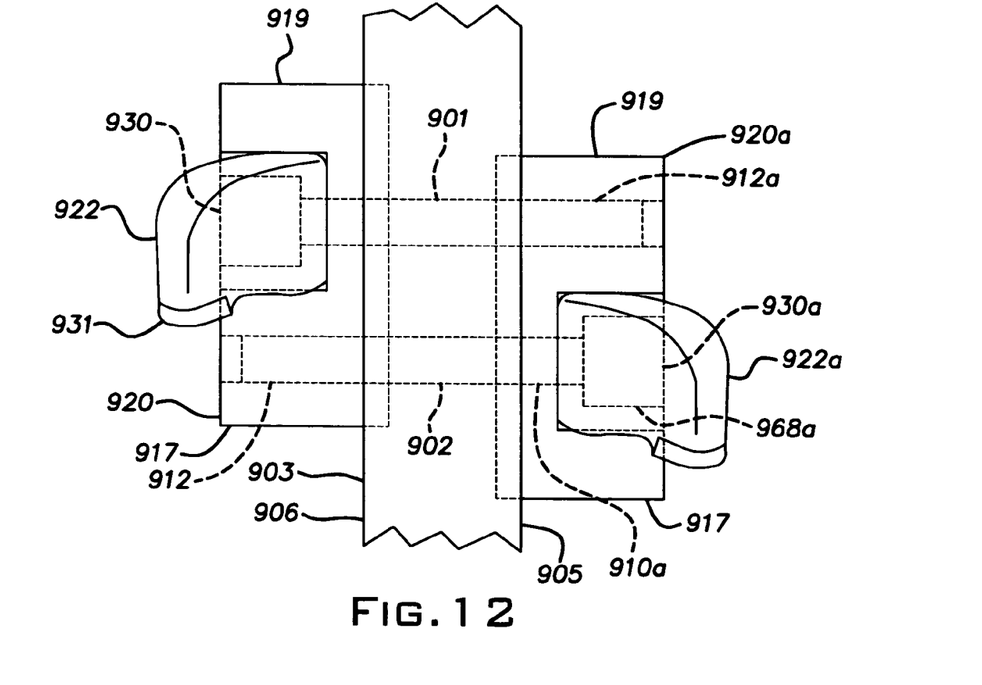
FIG. 12 is a side view of the portion of the apparatus shown in FIG. 11.

With reference to FIG. 12, the end of the bolt 930 is preferably received in a second aperture 912a of an identical block 920a that is positioned in a footprint on the opposite side 905 of the wheel 906. A second bolt 930a extends through a third aperture 968a in a tooth 922a, through a first aperture 910a in the block 920a and a fifth aperture 902 formed in the wheel 906. The end of the bolt 930a is then received in the second aperture 912 of the block 920 on the side 903 of the wheel 906.

Preferably, all of the blocks 920 mounted to a wheel 906 are identical. Thus, only one type of block 920 need be stocked in the event that a block needs to be replaced. It will be appreciated that as the leading side 917 of a block 920 becomes worn, the block 920 can simply be removed from the wheel 906, moved to the opposite side of the wheel 905, and remounted such that the leading side 917 is now the trailing side 919. This extends the useful life of the blocks 920. The "leading side" of a block is the side of the block that is facing the direction of rotation and is thus the side that is significantly more likely to first strike the tree stump. The "trailing side" of the block is opposite the leading side, and is thus the least likely side to contact the tree stump.

In addition to, or as an alternative to, the use of a footprint 924, a buttress structure can be welded to the wheel immediately behind the trailing side of the block. The buttress structure can simply be a bead of weld that extends upwardly from the face of the wheel. Alternatively, the buttress structure can be a separate component that is welded or otherwise fastened to the wheel immediately adjacent to the trailing side of the block. The buttress structure helps properly orient and position the block on the wheel during assembly and, more importantly, takes some of the shear load off the fasteners holding the blocks to the wheel during use of the apparatus. Shear forces transmitted to the leading side of the block are born by the fasteners and by the buttress structure. This improves the overall strength of the apparatus and makes it less likely that a block will become separated from the wheel.

The teeth 922 received in the blocks 920 will not be identical. The teeth nearest the central axis 904 of the wheel 906 will have a different angular extension relative to the plane of the side of the wheel than the teeth mounted at the peripheral edge 908 of the wheel 906. Furthermore, the cutting bits 931 of teeth on one side of the wheel must usually be tipped forward a few degrees (typically about 5 degrees) relative to the teeth on the other side of the wheel to insure that all of the teeth impact squarely against the tree stump during the stump removal operation.

Figure 13:
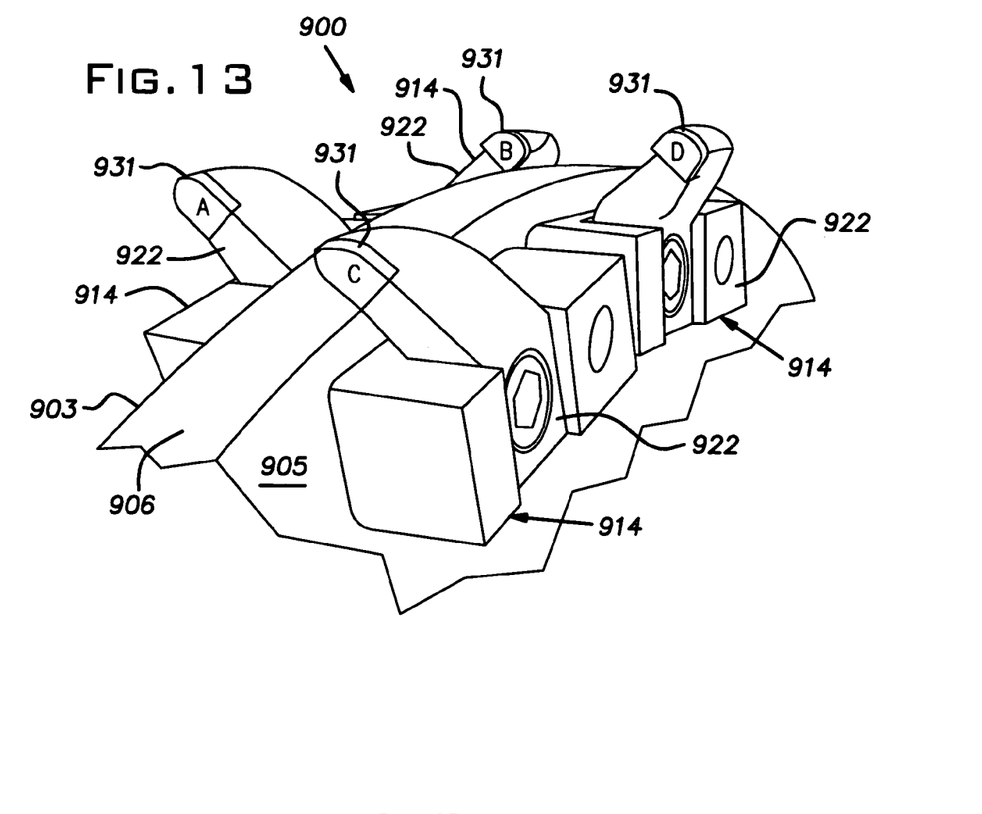
FIG. 13 is a perspective view of another portion of the apparatus shown in FIG. 11.
Figure 14:
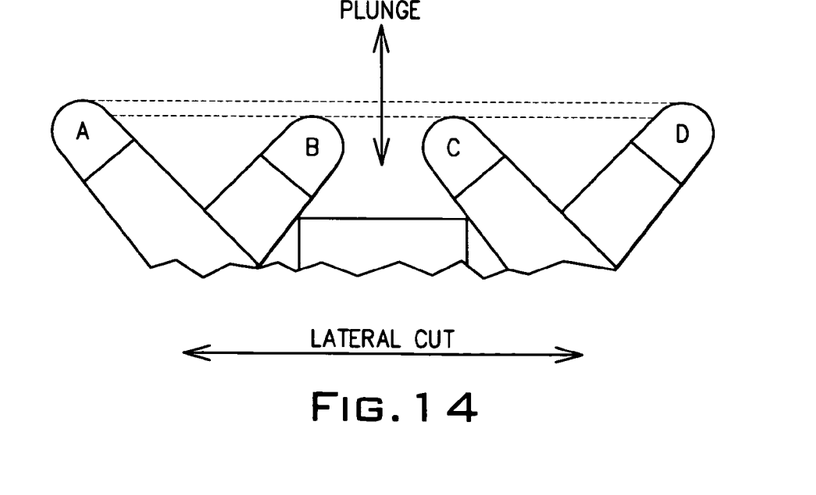
FIG. 14 is a schematic view showing a plunge cut kerf formed by the apparatus shown in FIG. 11.

FIG. 13 shows a perspective view of a portion of an apparatus 900 according to the invention. Four cutting assemblies 914 are shown, two on each side 903, 905 of the wheel 906. Each cutting assembly 914 is fitted with a tooth 922 that, when the wheel 906 is rotated, positions a cutting bit 931 to cut a kerf in the wood of the stump. For ease of illustration, each cutting bit 931 has been labeled with a letter A, B, C and D, respectively. FIG. 14 shows the kerf pattern produced when the wheel shown in FIG. 13 is rotated on its central axis. Cutting bits B and C do not extend away from the perimeter of the wheel 906 as far as cutting bits A and D. Accordingly, when the rotating apparatus 900 is moved laterally in either direction marked by the arrow labeled MOVEMENT OF BOOM ARM, cutting bits B and C do little, if any cutting. Cutting bits B and C only cut when the wheel 906 is moved in the direction of the arrow labeled PLUNGE. This reduces the wear on cutting bits B and C.

Figure 15:
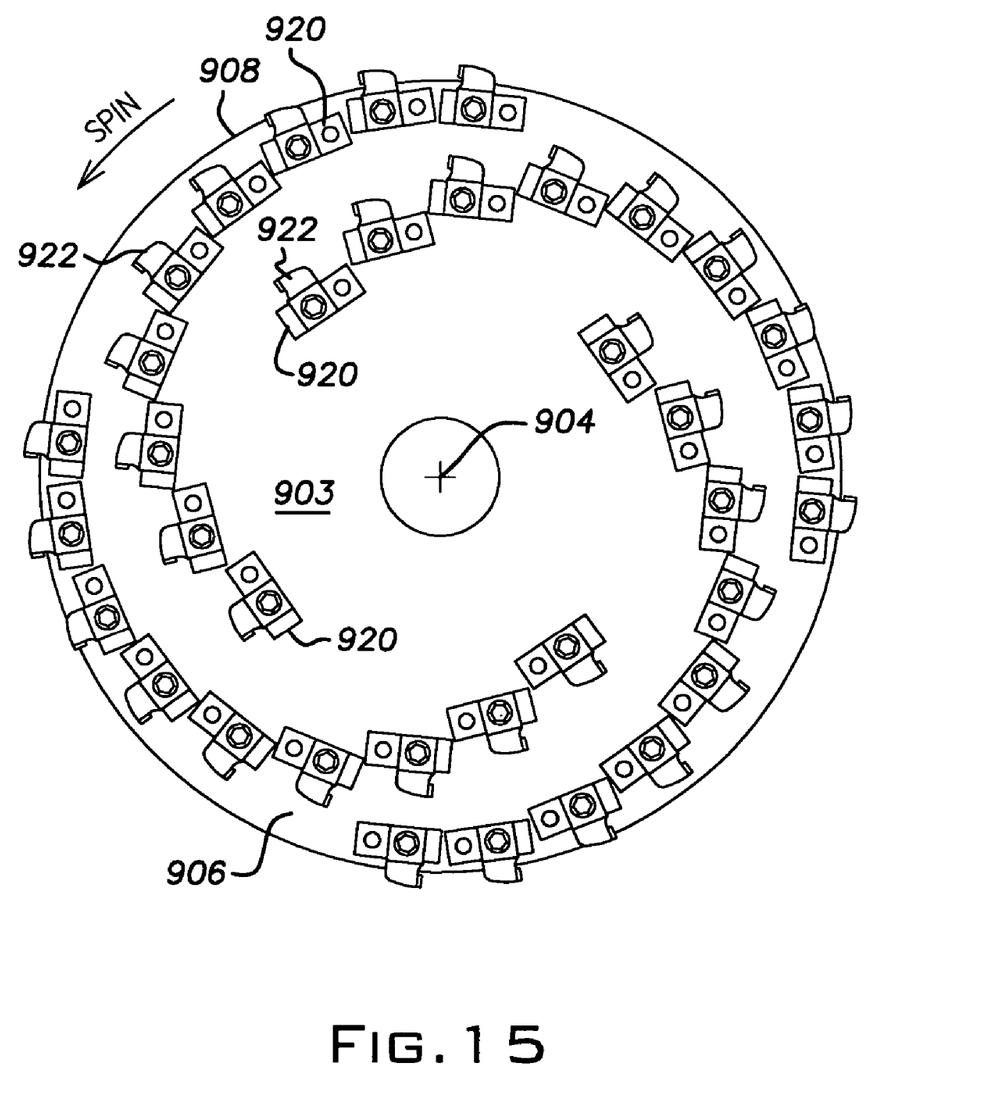
FIG. 15 is a side view of the entire apparatus shown in FIG. 11.

FIG. 15 is a side view showing the presently most preferred manner of arranging blocks 920 on the side 903 of the wheel 906. A total of thirty-six blocks 920 are arranged in four nine-block spiral arrays on each side of the wheel. The arrays originate from points that are slightly farther from the central axis 904 such that when the wheel 906 is rotating, the cutting bits 931 define circular rings that overlap to cover the entire surface of the wheel 906. Thus, when the rotating apparatus 900 is brought into contact with a tree stump, each of the cutting bits 931 bears the same burden and cuts the same amount of wood with each successive rotation as any other cutting bit. If the spiral arrays were not staggered to even the force, some cutting bits 931 might bear a greater amount of the cutting burden than other bits, which could lead to premature wear and undue stress.

The preferred method of grinding a tree stump involves rotating the apparatus 900 to the desired speed, typically about 800 rpm. Next, the boom arm moves the rotating apparatus laterally toward the tree stump. The cutting bits 931 contact the tree stump and rapidly cut away the wood. The boom arm continues to move the rotating apparatus laterally until an entire pass has been completed. Next, the rotating apparatus is moved forward and then laterally in the opposite direction. Successive passes are made until the stump has been reduced to near ground level at all locations. Finally, the rotating apparatus is plunged into the ground adjacent to the stump. The same pattern of lateral movement and grinding is followed, but this time the apparatus removes the stump a few inches or more below grade. The rotation apparatus quickly grinds away the stump and removes it permanently.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A stump-grinding apparatus comprising a plurality of cutting assemblies mounted to a first side of a rotatable wheel, wherein each cutting assembly comprises:
    a block having an inner side and an outer side and a trailing side, the inner side contacting the first side of the rotatable wheel between a central axis and a peripheral edge of the wheel;
    a buttress structure fastened to the wheel adjacent to the trailing side of the block;
    a tooth having a base portion received within a groove formed in the outer side of the block; and
    a fastener that passes through a first aperture extending through the base portion of the tooth, a second aperture extending through the block between the groove and the inner side of the block, and a third aperture formed in the wheel, the fastener fastening the tooth to the block and the block to the wheel.

2. The stump-grinding apparatus according to claim 1 wherein a plurality of cutting assemblies are also mounted to a second opposite side of the rotatable wheel.

3. The stump-grinding apparatus according to claim 2 wherein the fastener from each cutting assembly mounted on the first side of the wheel extends through the wheel and threads into a fourth aperture formed in the block of a corresponding cutting assembly mounted on the second opposite side of the wheel.

4. The stump-grinding apparatus according to claim 1 wherein each cutting assembly further comprises a cutting bit that is attached to a distal end of the tooth.

5. The stump-grinding apparatus according to claim 4 wherein the cutting bit has a "church window" shape.

6. The stump-grinding apparatus according to claim 4 further comprising a plurality of ridges on the back side of the cutting bit that engage with corresponding ridges on the distal end of the tooth.

7. The stump-grinding apparatus according to claim 4 wherein a first portion of teeth received in blocks mounted near the peripheral edge on both the first side of the wheel and the second side of the wheel support cutting bits that extend beyond the peripheral edge of the wheel between planes defined by the first side and second side of the wheel.

8. The stump-grinding apparatus according to claim 7 wherein a second portion of teeth received in blocks mounted near the peripheral edge on both the first side of the wheel and the second side of the wheel support cutting bits that extend beyond the peripheral edge of the wheel on either side of planes defined by the first side and the second side of the wheel.

9. The stump-grinding apparatus according to claim 8 wherein the cutting bits supported by the second portion of teeth extend farther away from the peripheral edge of the wheel than the cutting bits supported by the first portion of teeth.

10. A stump-grinding apparatus comprising a rotatable wheel having opposing sides to which are mounted a plurality of cutting assemblies, each cutting assembly comprising:
    a block having an inner side and an outer side, the inner side contacting the side of the rotatable wheel between a central axis and a peripheral edge of the wheel;
    a tooth having a base portion received within a groove formed in the outer side of the block; and
    a fastener that passes through a first aperture extending through the base portion of the tooth, a second aperture extending through the block between the groove and the inner side of the block, and a third aperture formed in the wheel.

11. The stump-grinding apparatus according to claim 10 wherein each fastener that passes through the first aperture extending through the base portion of the tooth, the second aperture extending through the block between the groove and the inner side of the block, and the third aperture formed in the wheel, extends through the wheel and is received in a fourth aperture formed in the block of one of the plurality of cutting assemblies mounted on an opposite side of the wheel.

12. The stump-grinding apparatus according to claim 11 wherein the fourth aperture is a threaded aperture.

13. The stump-grinding apparatus according to claim 10 wherein each cutting assembly further comprises a cutting bit that is attached to a distal end of the tooth.

14. The stump-grinding apparatus according to claim 10 wherein the cutting bit has a "church window" shape.

15. The stump-grinding apparatus according to claim 13 further comprising a plurality of ridges on the back side of the cutting bit that engage with corresponding ridges on the distal end of the tooth.

16. The stump-grinding apparatus according to claim 10 wherein a first portion of teeth received in blocks mounted near the peripheral edge on the opposing sides of the wheel support cutting bits that extend beyond the peripheral edge of the wheel between planes defined by the opposing sides of the wheel.

17. The stump-grinding apparatus according to claim 10 wherein a second portion of teeth received in blocks mounted near the peripheral edge on the opposing sides of the wheel support cutting bits that extend beyond the peripheral edge of the wheel on either side of planes defined by the opposing sides of the wheel.

18. The stump-grinding apparatus according to claim 16 wherein a second portion of teeth received in blocks mounted near the peripheral edge on the opposing sides of the wheel support cutting bits that extend beyond the peripheral edge of the wheel on either side of planes defined by the opposing sides of the wheel.

19. The stump-grinding apparatus according to claim 18 wherein the cutting bits supported by the second portion of teeth extend farther away from the peripheral edge of the wheel than the cutting bits supported by the first portion of teeth.

20. A method of removing a tree stump comprising:
providing a stump-grinding apparatus according to claim 1;
rotating the rotatable wheel; and
contacting the tree stump with the rotating wheel to cut or grind away the stump.

* * * * *